United States Patent [19]

Mitsuhiro

[11] Patent Number: 4,773,818
[45] Date of Patent: Sep. 27, 1988

[54] TURBINE

[76] Inventor: Kanao Mitsuhiro, 3-2, Chuou 1-Chome,, Yakeyama, Kure-shi, Hiroshima-Ken, Japan

[21] Appl. No.: 9,766

[22] Filed: Feb. 2, 1987

[30] Foreign Application Priority Data

Jul. 15, 1986 [JP] Japan .................. 61-166116
Aug. 21, 1986 [JP] Japan .................. 61-196849

[51] Int. Cl.$^4$ .............................. F01D 1/18
[52] U.S. Cl. ........................ 415/75; 415/76
[58] Field of Search ...................... 415/75, 76

[56] References Cited

U.S. PATENT DOCUMENTS

| 158,579 | 1/1875 | Fairfax | 415/76 |
| 1,245,392 | 11/1917 | Sheldon | 415/76 |
| 1,263,060 | 4/1918 | Henry | 415/76 |
| 1,869,106 | 7/1932 | Marchant | 415/76 |
| 1,902,439 | 3/1933 | Foss | 415/75 |
| 4,629,395 | 12/1986 | Mohsin | 415/75 |

FOREIGN PATENT DOCUMENTS 1831 12/1907 United Kingdom .............. 415/76

Primary Examiner—Larry I. Schwartz
Attorney, Agent, or Firm—Kramer, Brufsky & Cifelli

[57] ABSTRACT

The turbine comprises a casing having a plurality of grooves spirally formed upon an inner circumference thereof and a rotor having a plurality of grooves spirally formed upon an outer circumference thereof, each groove of the rotor having a plurality of vanes. The plurality of grooves in the casing are opposed to the plurality of grooves of the rotor, thereby a plurality of flow passages are formed spirally.

2 Claims, 4 Drawing Sheets

TURBINE

BACKGROUND OF THE INVENTION (1) Field of the Invention

This Invention relates to a turbine, in which a rotor within a casing is rotatable by fluid.

(2) Description of the Prior Art

According to a conventional turbine, a moving fluid is jetted toward a plurality of vanes from a nozzle fixed on a casing to rotate them high-speedily.

To obtain a powerful rotary force in a conventional turbine, it is necessitated to enlarge the diameter of each vane, but the strength of the rotary force is restricted. Even in a restricted rotary force, the velocity of the shaft rotation is so rapid that it must be reduced by a speed reducer. Thus, the shaft rotation is placed in a condition of high torque at a lower speed.

Further, each vane in a conventional turbine comprises a convex surface having a positive torque and a convex surface having a negative torque, so that a certain torque offset by the positive torque and the negative torque takes place. Namely, the moving fluid traversing between adjacent vanes forms a resistance to flow.

Further, there exist a number of spaces between a casing and a plurality of vanes, so that a wasteful outflow of a certain quantity of the moving fluid is unavoidable.

Further, the speed reducer must be provided with a high precision tooth profile.

Still further, it is required to install other auxiliary devices, so that the manufacturing and operating cost of the turbine becomes expensive.

In spite of such disadvantages, the conventional turbines are used at present because they have a high thermal efficiency and a long time operability.

In the present stage, any other turbine that have overcome the aforesaid disadvantages and inconveniences does not exist.

BRIEF SUMMARY OF THE INVENTION

It is a general object of this invention to provide a turbine which provides a very efficient rotary energy having a high torque with a moderate velocity.

More specifically, the turbine comprises a casing having a plurality of grooves spirally formed upon an inner circumference thereof and a rotor having a plurality of grooves spirally formed upon an outer circumference thereof, each groove of the rotor having a plurality of vanes. The plurality of grooves spirally formed upon the inner circumference of the casing are opposed to the plurality of grooves spirally formed upon the outer circumference of the rotor, thereby a plurality of flow passages are formed spirally.

The principle of the present turbine may be compared to a motor comprising a field coil in which magnetism flows in a coiled form, and a rotor having a magnetic force in the field coil.

Further, we may bring up the image of a top as a plaything. Namely, the top means a rotor, while a wound string means a casing. The top is rotated by drawing the string strongly. Thus, the top is rotated high-speedily in a coiled form. Thus, we may say that whereas a conventional turbine is a wind wheel, the turbine of this invention resembles the principle of the top.

BRIEF DESCRIPTION OF THE ACCOMPANYING DRAWINGS

DETAILED DESCRIPTION OF PREFERRED EMBODIMENTS

Preferred embodiments of this invention will now be described with reference to the accompanying drawings.

Figure 1:
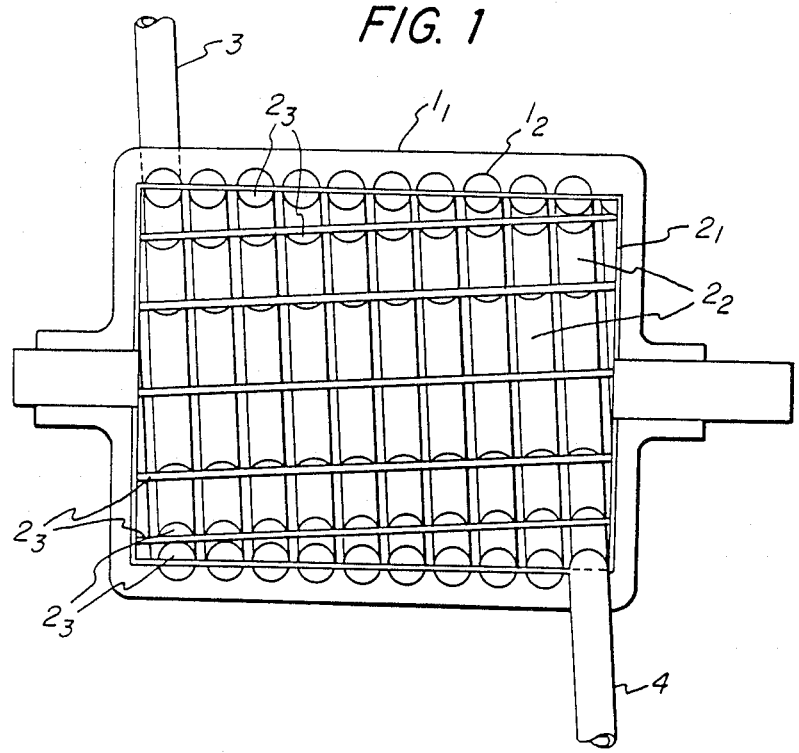
FIG. 1 is a section view of an embodiment of a turbine according to this invention.
Figure 2:
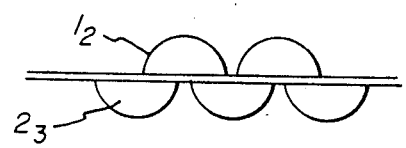
FIG. 2 is a schematic view showing a relationship of the grooves of of the casing with the grooves of the rotor.
Figure 3:
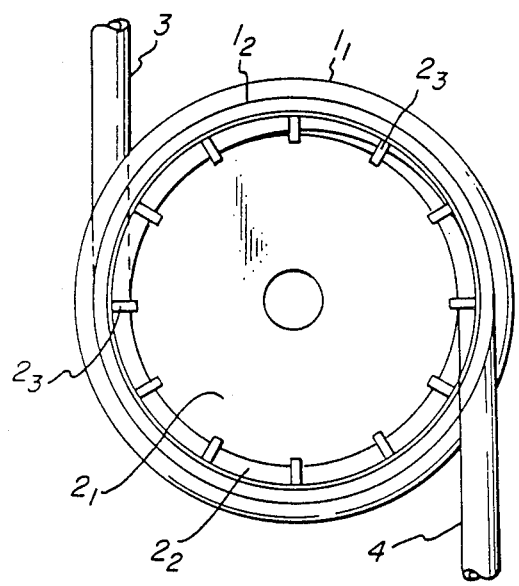
FIG. 3 is a section view of a further embodiment of this invention.

FIGS. 1 to 3 show an embodiment of this invention.

In FIG. 1, there is shown a cylindrical casing $1_1$, inside which a cylindrical rotor $2_1$ is disposed. Spirally disposed upon an inner circumference of the cylindrical casing $1_1$ are a plurality of grooves $1_2$ neighboring each other, each of which forms a semicircular section. It may be of a wedge type section. The plurality of grooves $1_2$ are disposed in order that a fluid supplied from an inlet 3 may flow in a coiled form between the inner circumference of the cylindrical casing $1_1$ and an outer circumference of the cylindrical rotor $2_1$.

On the other hand, spirally disposed upon the outer circumference of the rotor $2_1$ are a plurality of grooves $2_2$ which are partitioned by a plurality of vane $2_3$ to absorb fully the energy (such as heat or molecular movement) of the fluid flowing in a coiled form and to discharge the used fluid efficiently from an outlet 4. Each of the grooves $2_2$ may be of a semicircular section or a wedge type section. The plurality of vanes $2_3$ perform the function of partitioning plates. As shown in FIG. 1, the plurality of grooves $1_2$ of the casing $1_1$ are respectively opposed to the plurality of grooves $2_2$ of the rotor $2_1$ so as to form flow passages of the fluid.

The injecting angle of the fluid is set to conform to the inclination angle of the grooves $1_2$ of the casing $1_1$ as well as of the grooves $2_2$ of the rotor $2_2$. The moving fluid injected from the inlet 3 of the casing $1_1$ flows in a coiled form into a space between the inner circumference of the casing $1_1$ and the outer circumference of the rotor $2_1$ having the grooves $2_2$ and the vanes $2_3$, whereby the rotor $2_1$ is rotated high-speedily about an axis of rotation and the moving fluid is discharged from the outlet 4.

The shape of the inlet 3 may be equal to that of the outlet 4. It is not necessary to enlarge the diameter of the outlet 4 like a conventional turbine.

In operation of the turbine according to this invention, the moving fluid within the grooves $2_2$ of the rotor $2_1$ which is being rotated is diffused outwardly by means of a centrifugal force. As the velocity of the rotor $2_1$ becomes higher and higher, the grooves $1_2$ and $2_2$ and the vanes $2_3$ may apply an effective torque to the rotor $2_1$. Accordingly, the more powerful the centrifugal force is, the more efficient the rotation of the rotor $2_1$ becomes.

According to one aspect of this invention, the velocity of the fluid flowing in the flow passages between the plurality of grooves $1_2$ of the casing $1_1$ and the plurality of grooves $2_2$ of the rotor $2_1$ is nearly the same in the whole area from the inlet 3 to the outlet 4.

According to another aspect of this invention, the fluid flow pressure is lowered as the moving fluid is approaching the outlet 4, since such pressure is absorbed into the grooves $1_2$ and $2_2$. Preferably, the diameter of the rotor $2_1$ is longer and the pitch of each groove $1_1$ and each groove $2_2$ is smaller, thereby the fluid flow pressure becomes lower. The effective pressure and the effective size of the rotor $2_1$ are predetermined by the operating a tesing turbine.

Figure 4:
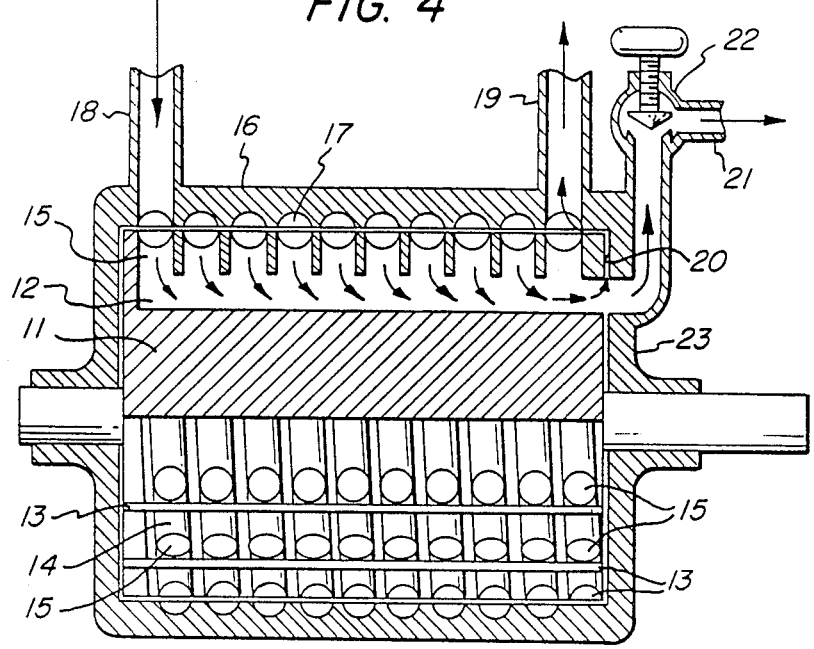
FIG. 4 is a partially cutaway plan view of the embodiment in FIG. 3.
Figure 5:
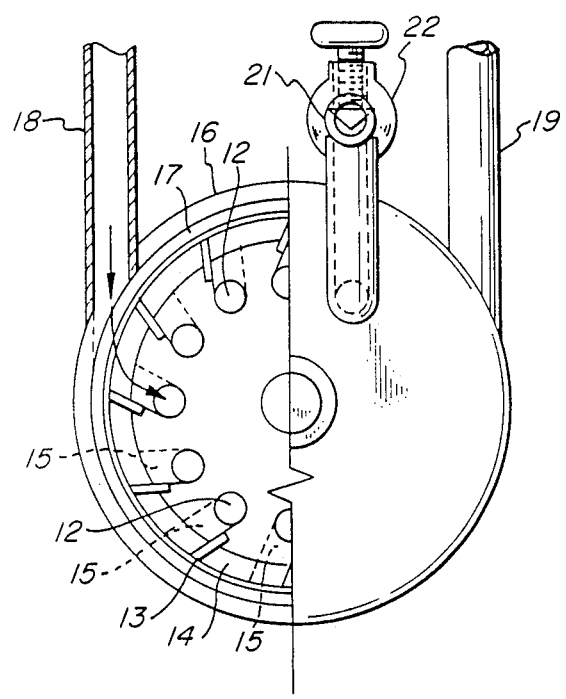
FIG. 5 is a cutaway view of the embodiment of FIG. 4.

A further embodiment of this invention will now be descirbed with reference to FIGS. 4 and 5.

FIG. 4 shows a section view of the further embodiment and FIG. 5 shows a partially cutaway plan view thereof.

In FIG. 4, a rotor $1_1$ is disposed within a cylindrical casing 16, and a plurality of grooves 14 are formed upon the outer circumference of the rotor 11. Numeral 13 are a plurality of vanes formed spirally and spaced each other upon the plurality of grooves 14. Perforated symmetrically upon each groove 14 are a large number of holes 15 which are communicated with a cavity 12. As shown in FIG. 4, the cavity 12 is formed as a flow passage along a shaft of the rotor 11. In this embodiment, the number of vanes 13 is set to be equal to that of hole 15. According to one aspect of this embodiment, since such cavity 12 is formed along the shaft of the rotor 11, its weight and material are reduced.

The fluid flow and discharge in this embodiment will be described.

The moving fluid is injected from an inlet 18 disposed on an end of the casing 16. A part of the fluid flows spirally in a small gap between the inner circumference of the casing 16 and the outer circumference of the rotor 11, while the other part of the fluid flows into the cavity 12 by way of the large number of holes 15. The fluid is discharged from an outlet 19 disposed on the other end of the casing 16 as well as from an auxiliary outlet 21 disposed in a side housing 23. The fluid flow within the side housing 23 is discharged under the control of a flow control valve 22 therein so as to obtain the optimum flow quantity. Thus, the optimum torque of the turbine can be attained.

The following are of the functions and effect of the turbine according to this invention.

(1) Since the moving fluid between the inner circumference of the casing and the outer circumference of the rotor flows in a coiled form, overcoming the resistance of the plurality of vanes formed upon the grooves, the rotary velocity of the rotor is not extremely high but set moderately.

Accordingly, it is not necessary to provide a speed reducer.

(2) Since the moving fluid for producing the rotation of the rotor is rotating in a coiled form, an idealisitic rotary energy is obtained. Accordingly, the turbine becomes a motor having a torque generating function.

(3) The fluid velocity from the inlet to the outlet is nearly constant, while the flow pressure is absorbed into the large number of grooves of the casing and rotor, so that the turbine can obtain a high torque with a low velocity. Accordingly, the operation of turbine is free from load.

(4) Since a gap between the inner circumference of the casing and the outer circumference of the rotor is similar to that of a labyrinth packing, the flow loss of the fluid is less.

(5) The profile of each vane does not require any special one such as a streamlined shape or the like. Accordingly, the manufacturing cost of the turbine is inexpensive. In addition, the construction of the turbine is simple.

(6) As discussed in the second embodiment, a part of the fluid is discharged continuously through a gap between the inner circumference of the casing and the outer circumference of the rotor, while the other part of the fluid is discharged discontinuously since the plurality of vanes form the resistance to flow. Under such circumstances, the turbine can obtain a high torque with a low velocity.

(7) The inlet of the moving fluid may be easily replaced with the outlet of it. The moving fluid may be air, gas, liquid or the like.

(8) Since the rotor having the plurality of vanes is rotated in the same direction as the moving fluid, a vortical flow occurring in the region of the plurality of vanes is very little, the noise and vibration of the turbine are less.

(9) Accordingly, the present invention may be applicable for aircraft gas turbines, jet engines, gas turbines for locomotives and automobiles and so forth.

(10) The principle of this invention may be used for pumps, hydraulic motors, transmission devices in water mills, etc.

What is claimed is:

1. A turbine; comprising:
    a casing having a fluid inlet and a fluid outlet;
    a rotor confined within said casing being rotated about an axis of rotation by a fluid flow through said casing;
    one or more first semicircular grooves formed spirally upon an inner circumference of said casing, said first grooves extending from said fluid inlet to said fluid outlet;
    one or more second semicircular grooves formed spirally upon an outer circumference of said rotor, said second grooves being positioned to oppose said first semicircular grooves to form one or more spirally disposed circular flow passages;
    said second semicircular grooves being provided with a plurality of vanes for receiving said fluid flow; and
    said fluid inlet and said fluid outlet being disposed on either end of the one or more spirally disposed, circular flow passages.

2. The turbine as claimed in claim 1 further comprising:
    said rotor being provided with a cavity means for directing a portion of said fluid flow through the rotor, said cavity means forming at least one flow passage disposed parallel to the axis of rotation of said rotor;
    a plurality of holes formed in said one or more first semicircular grooves, said plurality of holes being disposed adjacent said plurality of vanes and in fluid communication with said cavity means;
    an auxiliary fluid outlet in said casing being in fluid communication with said cavity means and said one or more circular flow passages; and
    flow discharge control means disposed in said auxiliary fluid outlet, said flow discharge control means for controlling fluid flow both through said one or more circular flow passages and through the cavity means so as to control the torque and velocity of the turbine.

* * * * *